United States Patent
Rohde et al.

(10) Patent No.: US 12,093,365 B2
(45) Date of Patent: Sep. 17, 2024

(54) TRANSACTIONAL, CONSTRAINT-BASED SYSTEM AND METHOD FOR EFFECTIVE AUTHORIZATION

(71) Applicant: Google LLC, Mountain View, CA (US)

(72) Inventors: Henning Korsholm Rohde, Seattle, WA (US); William C. Neubauer, III, Brier, WA (US); Rafael de Jesús Fernández Moctezuma, Kirkland, WA (US)

(73) Assignee: Google LLC, Mountain View, CA (US)

(*) Notice: Subject to any disclaimer, the term of this patent is extended or adjusted under 35 U.S.C. 154(b) by 610 days.

(21) Appl. No.: 16/939,721

(22) Filed: Jul. 27, 2020

(65) Prior Publication Data

US 2021/0034734 A1 Feb. 4, 2021

Related U.S. Application Data

(60) Provisional application No. 62/879,584, filed on Jul. 29, 2019.

(51) Int. Cl.
*H04L 29/06* (2006.01)
*G06F 21/44* (2013.01)
*G06F 21/62* (2013.01)

(52) U.S. Cl.
CPC ............. *G06F 21/44* (2013.01); *G06F 21/62* (2013.01)

(58) Field of Classification Search
CPC ............................ G06F 21/44; G06F 21/6236
See application file for complete search history.

(56) References Cited

U.S. PATENT DOCUMENTS

| | | | |
|---|---|---|---|
| 7,284,274 B1* | 10/2007 | Walls | G06F 8/70 726/25 |
| 8,671,013 B2* | 3/2014 | Cobb | G06Q 30/018 705/7.38 |
| 2003/0229623 A1* | 12/2003 | Chang | H04L 63/08 |
| 2017/0346862 A1* | 11/2017 | Hanhirova | H04L 63/08 |

* cited by examiner

*Primary Examiner* — Jason K Gee
(74) *Attorney, Agent, or Firm* — Lerner David LLP

(57) ABSTRACT

A new transactional, constraint-based system is provided to define and maintain authorization policies. Constraints are expressed as user-defined, domain-specific programs that operate on authoritative representations of entities and administrative hierarchies.

20 Claims, 6 Drawing Sheets

| ID | IsActive | Accounts | \<additional attributes\> |
|---|---|---|---|
| 1 | true | gaia:employeeA@company.com, uid:12345 | ... |
| 3 | true | gaia:employeeB@company.com, uid:23456 | ... |
| 4 | true | ad:COMPANY\employeeC, uid:34567 | ... |
| 5 | true | gaia:employeeD@company.com | ... |
| 6 | false | ad:COMPANY2\employeeE | ... |

Fig. 2

TRANSACTIONAL, CONSTRAINT-BASED SYSTEM AND METHOD FOR EFFECTIVE AUTHORIZATION

CROSS-REFERENCE TO RELATED APPLICATIONS

The present application claims the benefit of the filing date of U.S. Provisional Patent Application No. 62/879,584 filed Jul. 29, 2019, the disclosure of which is hereby incorporated herein by reference.

BACKGROUND

Some organizations, such as large companies or conglomerates, employ a large number of people. Sometimes these organizations utilize a number of different information systems for the employees, such as one system for managing headcounts, another system for managing budgets, another system for managing employee benefits, etc. Each system may have its own restrictions, and none on its own may provide a complete current state of the organization. Large organizations often use multiple systems for identity, authentication and authorization. If there is a mistake in data entry in some system, this may lead to unintended consequences, such as overly-wide permissions, information reported to the wrong management team, etc. Sometimes notifications sent by existing systems about changes and change requests are not uniformly attended.

Some examples of problems arising from inconsistencies among these various systems may include: (1) Lingering permissions and improper access; (2) Unpredictable behavior on manager change; (3) Incorrect return from a temporary assignment.

With respect to lingering permissions and improper access, with a planned transfer of an employee from one team to another within the organization, there is usually time for a developer to audit their code ownership, group ownership, and memberships. Despite removing the employee from day-to-day artifacts (ownership of files, requesting changes in role assignment systems, etc.), a number of permissions may be unintentionally retained, such as access to sensitive documents, because of an oversight in effectively updating every system.

With respect to unpredictable behavior on manager changes, sometimes employees may change both teams and roles, such as moving from a management role to an individual contributor role. Subordinate employees previously set up to report to the transferred employee in his initial role may be inadvertently transitioned to the employee's new team, due to the complexity of interacting systems around intermingled transfers. Not knowing what outcomes to expect is an indicator of business rules not being understandable across systems. Moreover, the employee may be automatically included in groups and such that are reserved for managers, even though the employee intended to join as an independent contributor, thus receiving overly-wide access.

With respect to incorrect return from a temporary assignment, a former subordinate of the employee that transferred teams and roles may still find himself reporting to the employee for a period of time after the employee has transferred teams and roles. For example, the subordinate may be included on lists and be granted improper access to existing resources tied to such groups. This scenario also illustrates how some business processes are tied to people instead of positions. In some organizations, there may be no accessible representation of the organization chart and positions optionally filled by people.

In addition to these issues, concerns about authentication space may arise. There is a lack of a consistent way to evaluate business rules and prove that the resulting state across permissions and assignments is valid and consistent. A common complication is that knowledge about business rules is duplicated across systems and/or eventually consistent. Specifically, there is a concern with flawed permissions, i.e., conditions in which access to resources is over- or under-permissioned through intentional or inadvertent use of existing systems.

SUMMARY

The present system is a transactional, constraint-based system for effective authorization that takes ownership of key pieces of data and functionality that are common across multiple systems. It consists of three primary elements: (1) The Unified Identity Store (UIS), a subsystem that provides the flexibility of having a unique, non-leaking, internal unique identifier for people and track the various representations and manifestations of identity across other systems; (2) The Administrative Hierarchy Store (AHS), a subsystem to canonically record the various relationships of assets and structures in an organization; and (3) the policy programming language, a Turing-complete, domain-specific language powerful enough to express policies as user-provided programs.

The present system provides for representing, in a standardized way in a central place, data from various different systems in an organization, and the various constraints and policies of each of the various different systems. While employees may have different representations of identities in the various different systems, the present system recognizes that those different representations correspond to the same person. This may be done without requiring identifiers used for such representations to be consistent across the various different systems. With respect to the various constraints, applying a domain-specific programming language allows for changes to one or more of the various different systems to be computed, such that any time a change to the present system is made, the constraints are satisfied.

One aspect of the disclosure provides a system for ensuring consistency in authorization across different software systems in an organization. The system includes one or more memories storing a correlation of various representations of an individual across the different software systems in the organization. The system further includes one or more processors in communication with the one or more memories, the one or more processors configured to receive, for each of the different software systems, relational information regarding a relationship of different entities in the organization, wherein each of the different entities has a defined set of authorizations, receive, for each of the different software systems, one or more constraints associated with the relational information, receive, from an author, a change to the authorizations in a first one of the different software systems, and compute, based on the change to the authorizations in the first one of the different software systems and the one or more constraints, corresponding changes to the relational information for other ones of the different software systems. The different entities may be jobs, teams, roles, individuals, or tasks. The relational information may include hierarchical information, such as one or more trees. The one or more processors may be further configured to detect inconsistencies among the one or more constraints for the different software systems. The defined set of authorizations may define at least one or permissions or responsibilities associated with the entity.

According to some examples, computing the corresponding changes includes applying a domain-specific programming language. The programming language may be strictly typed against a global dynamically-bound type state. Computing the corresponding changes may include transactionally managing policy programs as data. The programming language may be applied along with trees to allow extensive static analysis to avoid re-evaluating all constraints for every change.

Another aspect of the disclosure provides a method for ensuring consistency in authorization across different software systems in an organization. The method includes storing a correlation of various representations of an individual across the different software systems in the organization, receiving, at one or more processors, for each of the different software systems, relational information regarding a relationship of different entities in the organization, wherein each of the different entities has a defined set of authorizations, receiving, at the one or more processors, for each of the different software systems, one or more constraints associated with the relational information, receiving, at the one or more processors, from an author, a change to the authorizations in a first one of the different software systems, and computing, at the one or more processors, based on the change to the authorizations in the first one of the different software systems and the one or more constraints, corresponding changes to the relational information for other ones of the different software systems.

Yet another aspect of the disclosure provides a computer-readable medium storing instructions executable by one or more processors for performing a method for ensuring consistency in authorization across different software systems in an organization. Such method includes storing a correlation of various representations of an individual across the different software systems in the organization, receiving, for each of the different software systems, relational information regarding a relationship of different entities in the organization, wherein each of the different entities has a defined set of authorizations, receiving, for each of the different software systems, one or more constraints associated with the relational information, receiving, from an author, a change to the authorizations in a first one of the different software systems, and computing, based on the change to the authorizations in the first one of the different software systems and the one or more constraints, corresponding changes to the relational information for other ones of the different software systems.

BRIEF DESCRIPTION OF DRAWINGS

FIG. 2 is an example data structure storing information according to aspects of the disclosure.

DETAILED DESCRIPTION

Authorization Policy Basics

Figure 1:
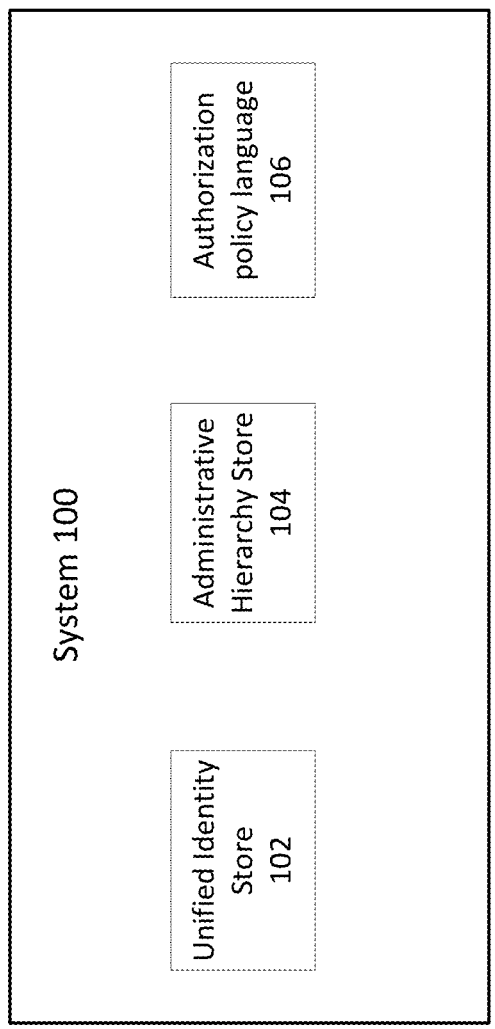
FIG. 1 is a block diagram illustrating an example system according to aspects of the disclosure.

Authorization policies can be expressed in various ways. In its simplest form, authorization involves:
Who: Person in question.
What: Resource/asset in question (and what kind of access: read/write/etc).

An authorization policy may be thought of as a predicate (or relation):
Who×What→{grant, deny}

For example, a specific policy might map (employeeA@, "/foo/bar":RW) to grant. In practice such static predicates may be insufficient, as the decision may depend on further information, such as:
When: Time of access, e.g., during local business hours or within some timeline.
Where: Location of access, e.g., whether the request is from a restricted country.
While: Condition, e.g., whether a machine's asset id is known to be malware-free.

Such an authorization policy is still a predicate, just over a more elaborate domain:
Who×What×When×Where×While→{grant, deny}

For example, a badge access policy might specify "you can enter your assigned building anytime, but other buildings during local business hours only." For simplicity, the shorter predicate form may be used without loss of generality.

According to one example, to help with a particular task, such as debugging a virtual machine (VM), an employee may occasionally add non-team members who need access to the VMs to help with the task. If such access can only be provided as a wide rationale-less permanent grant, recipients of the access (that was intended to be temporary) may retain privileged access after the task is complete. As shown in this example, authorization policies based on an insufficient domain can yield unsustainable short term solutions.

Ensuring that the policy implements the desired intent requires an understanding of an underlying rationale for the decision. Such a rationale is often missing. For example, descriptions for changing source code ownership often just state the change (e.g., "add foo@ to the list of owners"), not the underlying rationale. In some instances the rationale may be obvious to those involved, but over time and as people switch jobs, unstated rationales are lost.

Role-Based Access Control (RBAC) is a standard approach to making policy management more tractable. It essentially adds an abstract indirection that separates people and assets:
Role: Some grouping, usually based on job responsibilities.

The authorization policy becomes two predicates that can be independently maintained:
Who×Role ⋈ Role×What→{grant, deny}

The effective policy is a join of the two relations. For example, if (employeeA@, SWE) and (SWE, "/foo/bar": RW)↦ grant then access is granted. If no such role exists, access is denied. The appeal of RBAC is that when Role is small and well-chosen, the decomposition is far easier for humans to understand and maintain.

A common pitfall is to create fine-grained roles for each asset, at times to the extent that the set of defined roles approaches the set of defined resources/assets. When over-used, this practice reduces to not using roles at all but with added overhead, merely transferring the mechanics of where to maintain the relations to another system.

While role hierarchies (i.e., groups of groups) may help manage roles, in practice it also makes it far easier to widen permissions in unexpected ways. The underlying problem is not so much a failure of RBAC, but rather a result of the complex policies needed at a large organization such as a multinational conglomerate. Status quo suffers from a lack of machinery and data to verify the behavior of a change, with side-effects across many systems, subject to business policies.

The role assignment relation (Who×Role) is used to express complex relations and conditions, yet the information available in role hierarchies or direct assignments is in practice inadequate for understanding whether a role is appropriate and what changes are needed when people actually do change jobs or team. The underlying rationale is simply not available.

The focus of the present transactional constraint-based system and method for effective authorization described herein is how to correctly represent and manage the less-volatile role assignment relation (Who×Role) under continual business changes. The present transactional constraint-based system and method for effective authorization described herein are thus intended as a low-volume foundational system in larger authorization ecosystem, and less on the fast path of authorization requests.

Administrative Hierarchies

Roles are typically based on a person's job role attributes or their position in some administrative hierarchy, such as a reporting chain, business function, seat location, or product structure. While some groups are directly computed from such hierarchies, roles used for authorization are usually not, especially if a role is used to protect sensitive assets. Instead, such a role is constrained to a subset of some eligible, computable set of people.

By making the underlying hierarchies explicit, the role assignment relation can more naturally be expressed as:

Who×Org×Product×Location× . . . ×Role.

Although such a role assignment relation can be maintained as a simple database table, it is rarely done in practice. For example, a policy may state that the set of people in a given file should be technical personnel (e.g., software engineer, site reliability engineer, etc.) working on the product associated with the file. However, in practice, the files may seldom be updated when people are no longer eligible.

Role Assignment Representation

Many systems across the industry offer computed role assignments, such as auto-roles, to some degree but the expressivity and operational flexibility vary substantially. An auto-role system may offer a simple model based on inclusion/exclusion of primitive role requirements, such as group membership and reports-to relationship. The simplicity of the model pushes a lot of complexity into a number of hardcoded predicates, such as IsManager and IsNotManager, for example, even though one can be derived from the other. As a model, the expressivity is thus limited from a user's point of view. For example, a concept like "peer of your manager's manager" is not expressible without implementing a new predicate and deploying a new auto-role system release.

An access control list (ACL) and group membership system may have a more expressive model with set union, intersection and negation, but be operationally inflexible. For example, some such systems may only push the composite configuration to production weekly.

The present transactional constraint-based system and method for effective authorization described herein expresses complex authorization policies as programs. Handling such policy code as user data offers superior operational flexibility. Such programs are best expressed in a suitable (domain-specific) programming language, as opposed to flat lists or role hierarchies. Moreover, not only do people and assets change regularly, but policies change regularly as well and may vary substantially between companies and organizations within a company. Concretely, company divisions have their own policies and should not affect other company divisions.

Authorization=Justification+Constraints as Programs

The present transactional constraint-based system and method for effective authorization described herein includes a domain-specific programming language, for expressing arbitrary role constraints over such administrative hierarchies. These constraints ensure that only eligible roles for a person are allowed, even as jobs, policies, and administrative hierarchies change. The constraints may be, for example, rules or policies that should be followed for any change to data, such as changes in roles, teams, etc. By way of example only, a constraint may be: "In role X, need at least 2 physical people."

The structure and richness of a programming language enables engineers and advanced users to author and maintain reusable predicates, helper functions, constraints, etc. to provide higher-level concepts and abstractions for end users. The end user need not be able to see or even be aware of the programming language, but exclusively use higher-level concepts implemented in the programming language through purpose-built tools or UIs.

Safety is a paramount concern and the programming language draws on strongly-typed functional programming language theory to eliminate many classes of programming mistakes, such as null-pointer dereferences, off-by-one errors, etc. This foundation makes it difficult, but not impossible, to write bad constraints in the present system. Existing policy languages do not offer similar guarantees. For practical reasons, the programming language may be solely expressed as protocol buffers to sidestep issues regarding syntax and parsing and to leverage existing tooling and practices.

As a concrete example, using Go language bindings, consider the recursive, polymorphic function Contains in the programming language. The function takes two arguments, a set and an element, and returns a boolean indicating whether the element is a member of the set. It works by comparing the element to each member of the set. The Go code simply constructs a proto representing the programming language function:

```
var (
    // Contains : set<'a> x 'a -> bool returns true iff the given set contains the
    // given element.
    Contains = FuncID("std", "set", "Contains")
    contains = NewFunc2(Bool( ), Contains, "set", Set(A), "element",
        A, SetCase(Var("set"),
            Lit(false),
            "elm", "tail", Or(
                Eq(Var("elm"), Var("element")),
                CallRec(Contains, Var("tail"), Var("element")),
            ),
        ),
    )
)
```

The rest of the section assumes a passing familiarity with functional languages, such as SML or Haskell. For brevity, SML-like syntax is used for code examples with list-syntax for sets and a special read function to read the node from a key. The above example looks as follows:

```
// Contains : set<'a> x 'a -> bool returns true iff the given set contains the
// given element.
fun Contains set:set<'a> element:'a =>
    (case set of
        [ ]             => false
        | elm::tail     => elm = element orelse Contains(tail, element)):bool
```

Any specific function could instead be implemented as a built-in primitive. The value proposition of the programming language is that users can implement arbitrary computations on the administrative hierarchies.

As a more realistic example, a policy that "the leads of a product must be on the team that owns it" might look like the following in the programming language:

```
// LeadsWorkInTeam node<product> -> bool is a predicate function. It checks whether
// all persons in leads are in the team organization.
fun LeadsWorkInTeam n:node<product> =>
    (case FindTeam(n) of
        NONE                => true
        | SOME(team)        => PeopleWorkIn(team, n.leads)):bool
// FindTeam : node<product> -> opt<key<organization>> returns the nearest owner
// team.
fun FindTeam n:node<product> =>
    (case n.team of
        NONE                => case n.product of
            NONE                    => NONE // not found: root has no team
            | SOME(parent) => FindTeam(read(parent))
        | SOME(team)        => SOME(team)):opt<key<organization>>
// PeopleWorkIn : key<organization> x set<person> -> bool returns true iff the given // set of
people all work in the team.
fun PeopleWorkIn team:key<organization> people:set<person> =>
    (case people of
        [ ]                 => true // ok: no people
        | empl::tail => WorksIn(team, empl) andalso PeopleWorkIn(team, tail)):bool
// .. and more helper functions ...
```

Both the policies and the data they operate on are user-provided and updated transactionally, as well as decoupled from binary releases. When changes are made, any person no longer satisfying a role constraint can be automatically removed or the change can be rejected. This is possible to do mechanically, because the system by construction maintains a justification of why access may be granted rooted in the administrative hierarchies. For the example above, if a lead transferred to a new position elsewhere in the company, they would have to be removed from the product leads field for the LeadWorkInTeam to be satisfied (and lose administrative access, be removed from oncall groups, etc). More pointed insider risk constraints would be to require that multiple persons sign off on certain changes.

The generality and flexibility of this approach allows it to be scaled to a large conglomerate. Additionally, there are many practical and operational aspects. For example, any policy is an approximation. A system that does not embrace exceptions will lead to overly-wide permissions, as people work around the system. The present system enables employees to collaborate safely and seamlessly across formal boundaries by having their tools enforce the correct behavior in the least intrusive way.

Architecture

As shown in FIG. 1, system 100 to support effective authorization includes several parts: a Unified Identity Store (UIS) 102, an Administrative Hierarchy Store (AHS) 104, and an Authorization Policy Language 106. These parts 102-106 may be packaged in a transactional engine leveraging a distributed database. Integration with upstream and downstream systems ensures that the expressed policies are enforced.

Unified Identity Store

Various different systems in an organization may each have different representations of a single person. For example, "employeeA" in one system may be referred to as "empA@" in another system and "employee-A" in another system. The present constraint-based transactional system provides for recognizing that all of these different representations refer to the same individual. According to some examples, this may be performed in a bootstrapping phase when new employees are onboarded into an organization. In further examples, the different representations may be recorded together in the present system. Separation of powers ensures that no single person (a physical and legal entity) can compromise particularly sensitive resources. At a large scale organization, each person may regularly use different identities (or accounts) across various identity providers, such as Active Directory, Unix accounts, and GAIA. The set of required identity providers may not be known, given future company mergers and acquisitions.

The present transactional constraint-based system and method for effective authorization described herein includes an authoritative UIS 102. The UIS 102 is effectively an indirection from person to identities and any other metadata relevant to authorization. The primary UIS key for a person is never exposed outside the system. Only identities for a person are exposed outside the system, and they come and go as needed. This property provides flexibility to represent and handle identities and their lifecycles across employments.

FIG. 2 provides an example UIS. In this examples, the UIS 102 is a table correlating an identifier, status, accounts, and additional attributes. It should be understood that in other examples the UIS 102 may be represented using different data structures, and may include additional or different types of information.

As shown in FIG. 2, the UIS 102 identified four active employees and one inactive employee. In particular, in this example the four active employees include employees A, B, C, and D, and the inactive employee is employee D.

The UIS 102 can help avoid capture of identities, where the account key used (like username or role/group name) is repurposed and a person gains privileges from the old association, by always giving out unique identity tokens (e.g., employeeA'123 or human-1 vs employeeA) to downstream systems. Conversely, an assigned username for an employee that never actually started can be reused if unexposed. Identities, once exposed, may perpetually linger outside of reach, such as written down on a post-it. Identities can be correctly split and merged throughout the system to fix data entry errors where people are confused with each other.

Administrative Hierarchy Store

Returning to FIG. 1, the AHS 104 may be used for representing tree-shaped administrative hierarchies. The AHS 104 stores resources and relationships that define access privileges. The AHS 104 stores a collection of hierarchical structures across various domains and maps true identities into these structures. Authorization roles should ultimately be defined in terms of these structures, so that they can be re-computed when structures change.

Figure 3:
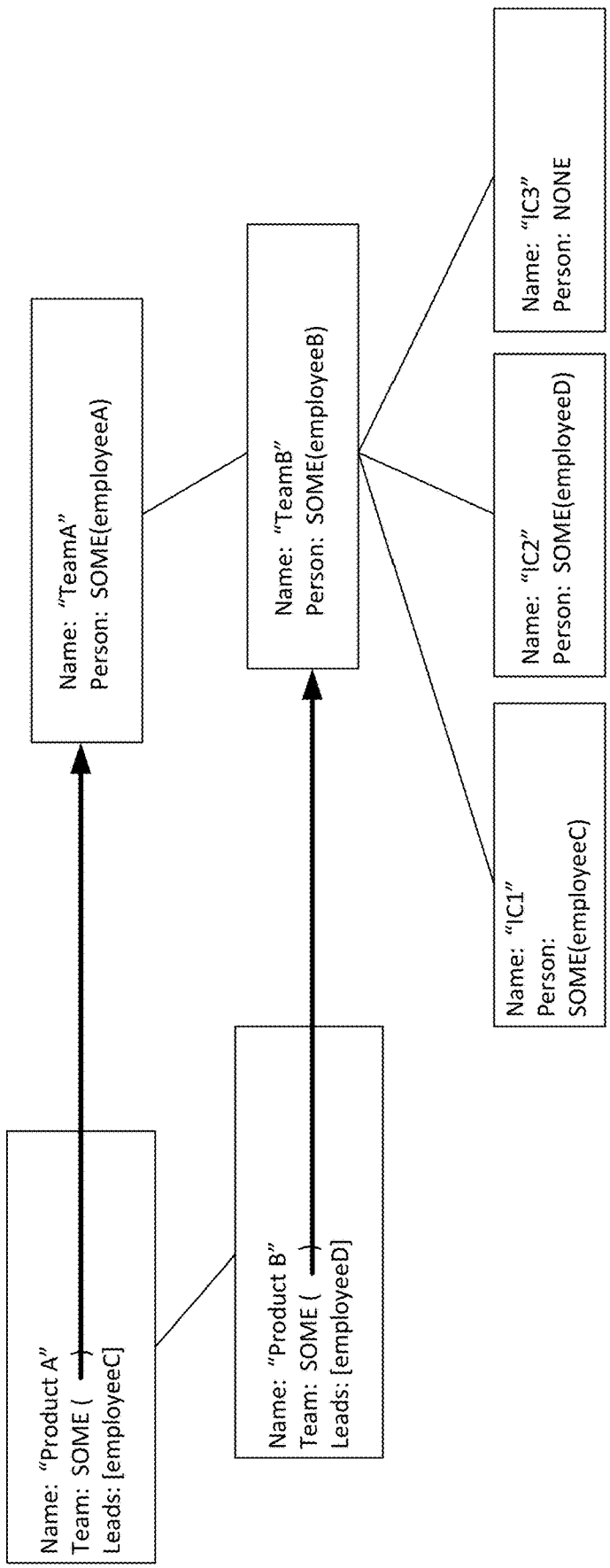
FIG. 3 is a relational block diagram illustrating two example hierarchies according to aspects of the disclosure.

FIG. 3 illustrates two example hierarchies: an organization hierarchy and a product hierarchy. The organization hierarchy is a tree of positions that may or may not be filled. If filled, it contains the UIS identifier of the person (although an account name may be used instead of the identifier for readability). The product hierarchy is a tree of product areas and products, optionally owned by a team (using arrows to represent the node identifiers for readability) with a set of technical leads. The Leads field is a simple example of how parts of the role assignment relation (Who×Role) can be represented in the present transactional constraint-based system and method for effective authorization.

The tree shape comes into play as nodes are added and removed as well as for approvals and escalations, e.g., if an approver for an urgent request is on vacation. A tree induces well-defined concepts: parent, parent chain ("trunk"), peer, subtree, etc. A constraint is naturally scoped to a subtree. The various hierarchies are distinct yet tightly coupled. For example, the hierarchies may include product, team, cost center, leads, code location, etc.

The representation and modelling of a hierarchy may evolve over time—for example, if it is determined that a position hierarchy is not the best way to represent an organization, the system and policies can accommodate such schema changes.

Authorization Policy Language

Returning again to FIG. 1, the authorization policy language 106 is a strongly-typed domain-specific programming language with support for polymorphic functions and procedures. The language makes a strict distinction between expressions and statements. The expression subset forms a functional, side-effect-free (except for non-termination) sublanguage with option and set types to support recursive helper functions and constraints. These properties help ensure that well-typed user constraints won't fail during evaluation due to programming mistakes. The decomposition of an effective policy as separate constraints—possibly by different authors—aid correctness and maintainability.

Statements are used for updating the state in a single transaction. A unique aspect of the programming language is that functions, procedures and trees are part of the state, not statically scoped. The signatures of functions, procedures, and trees may thus change and expressions and statements can only be meaningfully typed in the context of a concrete type state. However, regardless of signature changes are made in a transaction, the state as a whole should remain well-typed. A novelty of the programming language as a language is how it blends aspects of dynamically-typed languages like Smalltalk with aspects of strongly-typed languages like SML.

As a practical aside, there is no direct programming language syntax for the present system—only Abstract Syntax Trees (ASTs) represented as protos, XML, JSON or similar. This avoids potential re-parsing issues under language revisions and instead targets language bindings from general-purpose languages, such as Go, Java, Python, and C++. Technical users would maintain the programming language code via builders in their preferred language.

The type system supports primitive, option, set and tree (schema-like) types with type variables and function polymorphism. In addition, it has polymorphic, dependent types for working with keys, paths and nodes of trees. In other words, the language tracks the various kinds of tree references in the type system, while still supporting convenient helper functions that work on any tree or any set and so on.

Below are two illustrative polymorphic signatures in the programming language standard library, where 'a range over types and 't range over tree identifiers:

std.set.Contains: set<' a>x'a→bool
    std.tree.SubTree: key<'t>→set<key<'t>>

The programming language type is system and expressivity focused. It would be possible to extend it to a Hindley-Milner type system with higher-order functions, fine-grained tree subtyping and user-defined algebraic data types, for example.

Expressions form the purely functional core of the programming language; they cannot modify the system and are used to define functions and constraints, such as predicate functions on tree nodes. There are no operators that violate type safety. There are also no literals for persons or tree keys, which may become invalid, so the system offers a guarantee that any runtime value of type key<'t> must be a valid key. The typing rules for expressions in a type state and local environment are fairly standard for a functional language. Functions should be explicitly typed.

An example policy may be: "the leads of a product must be on the team that owns it." In the programming language pseudo-code, this example policy would be:

```
// LeadsWorkInTeam node<product> -> bool is a predicate function. It checks whether
// all persons in leads are in the team organization.
fun LeadsWorkInTeam n:node<product> =>
    (case FindTeam(n) of
        NONE                => true
        | SOME(team)        => PeopleWorkIn(team, n.leads)):bool
// FindTeam : node<product> -> opt<key<organization>> returns the nearest owner
// team.
fun FindTeam n:node<product> =>
    (case n.team of
        NONE                => case n.product of
            NONE                    => NONE // not found: root has no team
            | SOME(parent) => FindTeam(read(parent))
        | SOME(team)        => SOME(team)):opt<key<organization>>
// PeopleWorkIn : key<organization> x set<person> -> bool returns true iff the given // set of
people all work in the team.
```

```
fun PeopleWorkIn team:key<organization> people:set<person> =>
   (case people of
      [ ]                    => true // ok: no people
      | empl::tail => WorksIn(team, empl) andalso PeopleWorkIn(team, tail)):bool
// .. and more helper functions ...
```

A constraint is a node predicate that is attached to a tree and enabled or disabled on a subtree basis. All constraints in the present transactional constraint-based system should be satisfied. The constraint LeadsWorkInTeam holds for every node in the example product hierarchy in the previous section. Many other configurations would equally satisfy the constraint in contrast with auto-roles: any combination of employeeB, employeeC and employeeD could form the leads of TeamB, say, but employeeA could not. A different LeadsWorkInTeam policy might have allowed it.

Statements form the imperative language for updating the state, notably role assignments and manipulating tree nodes but also defining functions and procedures. Control flows, such as loops and conditionals, are supported. Parameterized statements can be stored as reusable named procedures.

A transaction may be a closed, possibility composite statement, such as a program, representing a complete update. If executed, it is applied atomically and all constraints in the system must hold afterwards for it to be accepted. Otherwise, it is rejected.

For example, referring to FIG. 3, consider the transfer of employeeD's position (IC2) to employeeA (TeamA) against the example hierarchies: it would be rejected, because the LeadsWorkInTeam constraint fails for the "ProductB" product. On the other hand, the transfer of employee C's position (IC1) to employeeA (TeamA) would be accepted.

Transactional Engine

The fundamental stores used in present transactional constraint-based system and method for effective authorization contain the latest view of the world. Any change to the state of the world remains consistent with existing rules. Similarly, any evaluation of rules should be done against a consistent snapshot. These requirements neatly reduce to a transactional problem. It is also desirable that such evaluations occur with low latency, as they will likely occur as part of approval flows.

The programming language expression queries and transactions exclusively go through a program server for the present transactional constraint-based system and method for effective authorization, with all state stored in a distributed database or other transactional store. Functions, procedures and various metadata are stored in system tables, with a fixed cell containing the type state version for cache invalidation. This setup supports a theoretically arbitrary number of stateless servers where all operations are transactional. Trees are stored as one or more separate tables.

With the programming language being a specification, the evaluation engine enjoys substantial implementation freedom, including tree-specific layout, optimizations and secondary indices.

Integration with Existing Systems

The core system is not intended to replace existing authorization systems, but rather define the underlying information more concisely. For example, group definitions represented computationally in the present transactional constraint-based system could be expanded into actual populated groups with some execution latency. For fast deauthorization, a lower latency path may be created. For certain sensitive operations or situations, direct authorization from present transactional constraint-based system may be required.

Figure 4:
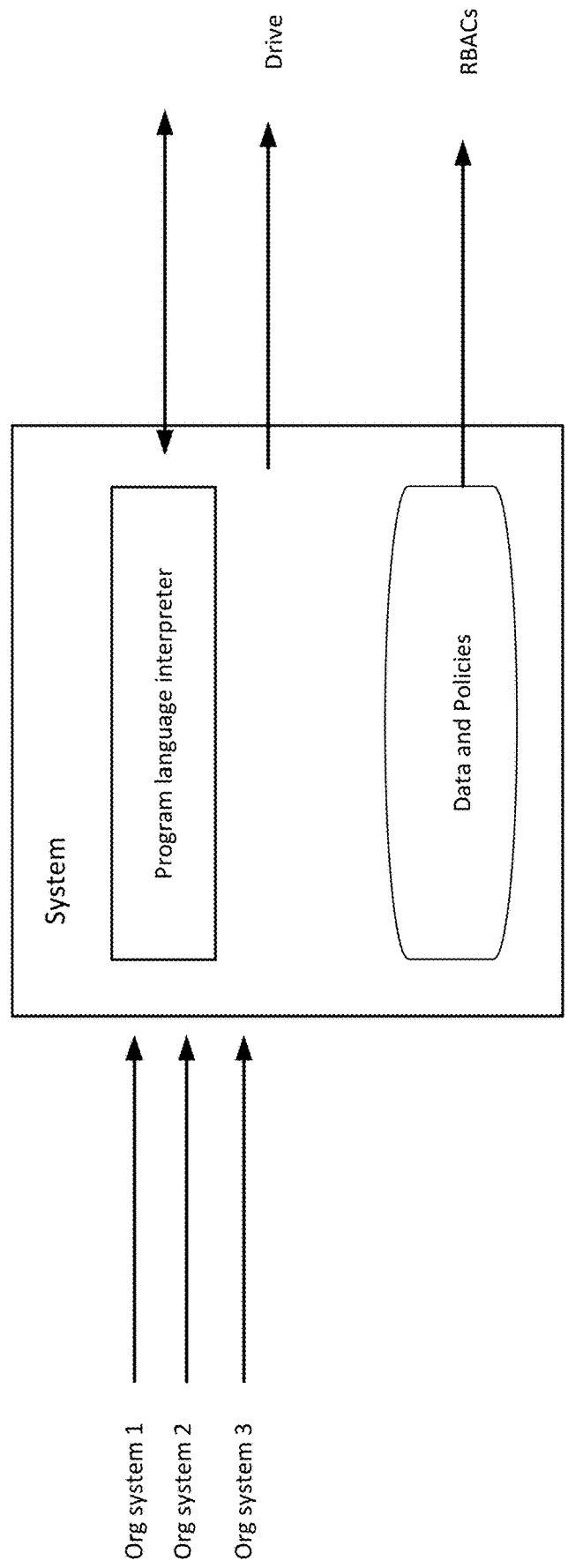
FIG. 4 is an example system diagram illustrating integration of the system with existing systems according to aspects of the disclosure.

FIG. 4 illustrates an example integration with existing authorization systems. Upstream input systems, such as human resources tools for headcount, schedules, benefits, etc., or other tools, may be tightly integrated to the extent of storing data in the present transactional constraint-based system directly to prevent changes that violate constraints. Where that is infeasible, the present transactional constraint-based system can either in some cases automatically restore integrity by dropping roles, or flag such updates until manually augmented. The present transactional constraint-based system should act as a gating system for this information, so that bad upstream updates do not actually take effect even temporarily.

For downstream systems, distributed database queues may be used to reliably propagate changes outside the transaction. There may thus be multiple levels of criticality with different latency and failure modes. Examples include within a transaction, push in <1 min or alert, push in <1 hour or bug, push in <24 hours or give up and let a daily batch job pick it up. etc. Streaming audit and anomaly detection systems may be supported. All such systems may be separate services with their own releases, deployment and scale.

Figure 5:
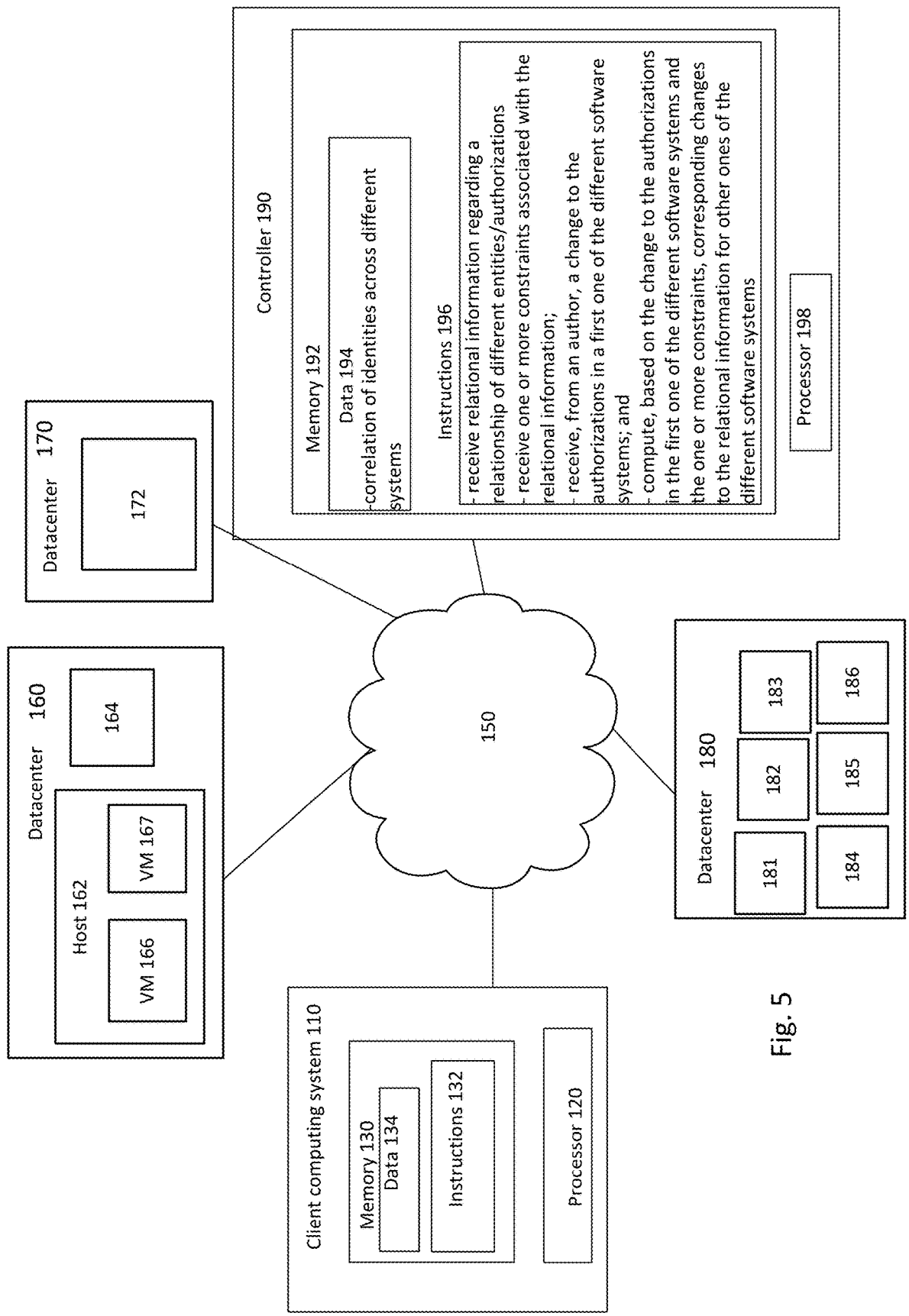
FIG. 5 is a block diagram illustrating an example system according to aspects of the disclosure.

FIG. 5 illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer, intended for use by a person having all the internal components normally found in a personal computer such as a central processing unit (CPU), CD-ROM, hard drive, and a display device, for example, a monitor having a screen, a projector, a touchscreen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 5 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 3, it should be understood that any number of virtual machines may be supported by any number of host computing devices. Moreover, it should be understood that the configuration illustrated in FIG. 5 is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

Moreover, various backend systems may be built upon the distributed data store. For example, identity management systems, domain name server (DNS) setting management systems, etc. Such backend systems may to some extent be interrelated. For example, a user of the DNS setting management system may log in using an identification managed by the identity management system.

In some examples, each datacenter 160-180 may also include a number of storage devices (not shown), such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above. The controller 190 may be configured to populate changes affecting authorization parameters to various components of the distributed system without shutting down service to users. For example, the controller 190 identify a correlation of various representations of an individual across the different software systems in the organization; receive, for each of the different software systems, relational information regarding a relationship of different entities in the organization, wherein each of the different entities has a defined set of authorizations; receive, for each of the different software systems, one or more constraints associated with the relational information; receive, from an author, a change to the authorizations in a first one of the different software systems; and compute, based on the change to the authorizations in the first one of the different software systems and the one or more constraints, corresponding changes to the relational information for other ones of the different software systems.

Client 110, datacenters 160-180, and controller 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Client 110 may request access to a program utilizing one of the backend systems in the cloud. Such request may be handled by the controller 190 and/or one or more of the computing devices in datacenters 160-180. When changes are made that affect authorization in a first system, such as changing access rights for particular roles, the controller may determine corresponding changes in other systems that should take effect, without shutting down the backend systems or otherwise disrupting service to the client 110. In some examples, the controller may automatically enter such changes. In other examples, the controller may prompt the author or other end users to confirm whether a change should be made or to update a particular system in accordance with the constraints.

Practical Considerations

Nominal vs. Effective Permissions

Even where nominal permissions can be managed effectively, there may still be a delay before they take effect, e.g., role groups may need to be replicated to all datacenters. For example, where a team relies on an automatic role-assignment to manage temporary access to production systems, and an engineer in the team with specific knowledge of a piece of the system needs temporary access to debug a customer issue for Product A, the person may request access but decide not to wait for the approval to show up after tens of minutes or be approved and fully propagated hours later. The engineer simply walks to whoever has production access and uses their terminal to help the customer. After repeated occurrences, the engineer will likely just ask for permanent access—reverting to overly-wide permissions. The outcome is the exact opposite of what the time-delimited permission setup intended to accomplish.

The present system offers considerable freedom to pick a suitable mechanism for each situation. Not all changes need to go through the same flow, and multiple options exist for how each role is materialized and in turn what other systems are involved to make role changes effective. Such choices will be system-dependent and may be operation and person dependent.

Prevention vs. Detection

Coarse, automated, and eventually-consistent systems sometimes unwillingly aid in the creation of opportunities for attack and may hinder the detection as well, if they are hard to reason about. In some cases, even if detected upfront, automation and the time delay to undo the change may make some attacks difficult to prevent. Prevention is preferable for sensitive information, but in practice it is elusive to achieve, especially in the context of insider risk.

The present system offers a few practical strategies. Constraints, including separation of power with multiple approvers, will limit the scope and exposure for any single person. This will be particularly effective if upstream systems integrate with the present system to disallow rejected changes or if its propagation is gated by the present system. The various administrative hierarchies also separate the organizational chart from who works on what, and as such discourages automatic grants of roles based on transfers. Finally, granting and revoking permission need not use the same mechanism. De-authorization, notably temporary suspension, may need to take effect faster, for example.

Scheduled Changes

Many changes are planned. For example, internships end at a known date, internal transfers and the start date of new hires are scheduled weeks or months in advance, etc. Most authorization systems do not support such transitional states or support them only partially. In the present system, given such a change is a syntactical statement, which can be stored as pending in the system and as part of transaction execution. The statements can be inspected and potentially updated, or the transaction rejected, if there are conflicting changes.

For example, let's say employeeC is scheduled to be added as a lead of TeamB one month into the future, but after two weeks is moved to a new position under employeeA thus invalidating the scheduled change. With some transitional awareness, the scheduled change may instead be handled at the time of the conflicting transaction. Some scheduled changes can be made more robust if the administrative hierarchies are modeled to accommodate them. For example, scheduled people transfers are more robust under a position hierarchy than a person hierarchy.

Sensitive Information

The data stored in the present system may be of varying degrees of sensitivity and confidentiality. For example, some authorization policies within an organization may refer to personal relationships, such as whether people are related, married, or dating. Not everyone should have access to such information. Constraints that fail for such reasons may need to fail without a public rationale.

Similarly, some trees may model confidential information, such as whether a person is flagged by security, that likewise blocks certain roles to be granted. Only certain people can author such data and policies. The strict type system of the present system makes it tractable to contain information within the system. For example, queries that refer to certain confidential trees can be rejected without even running them.

Figure 6:
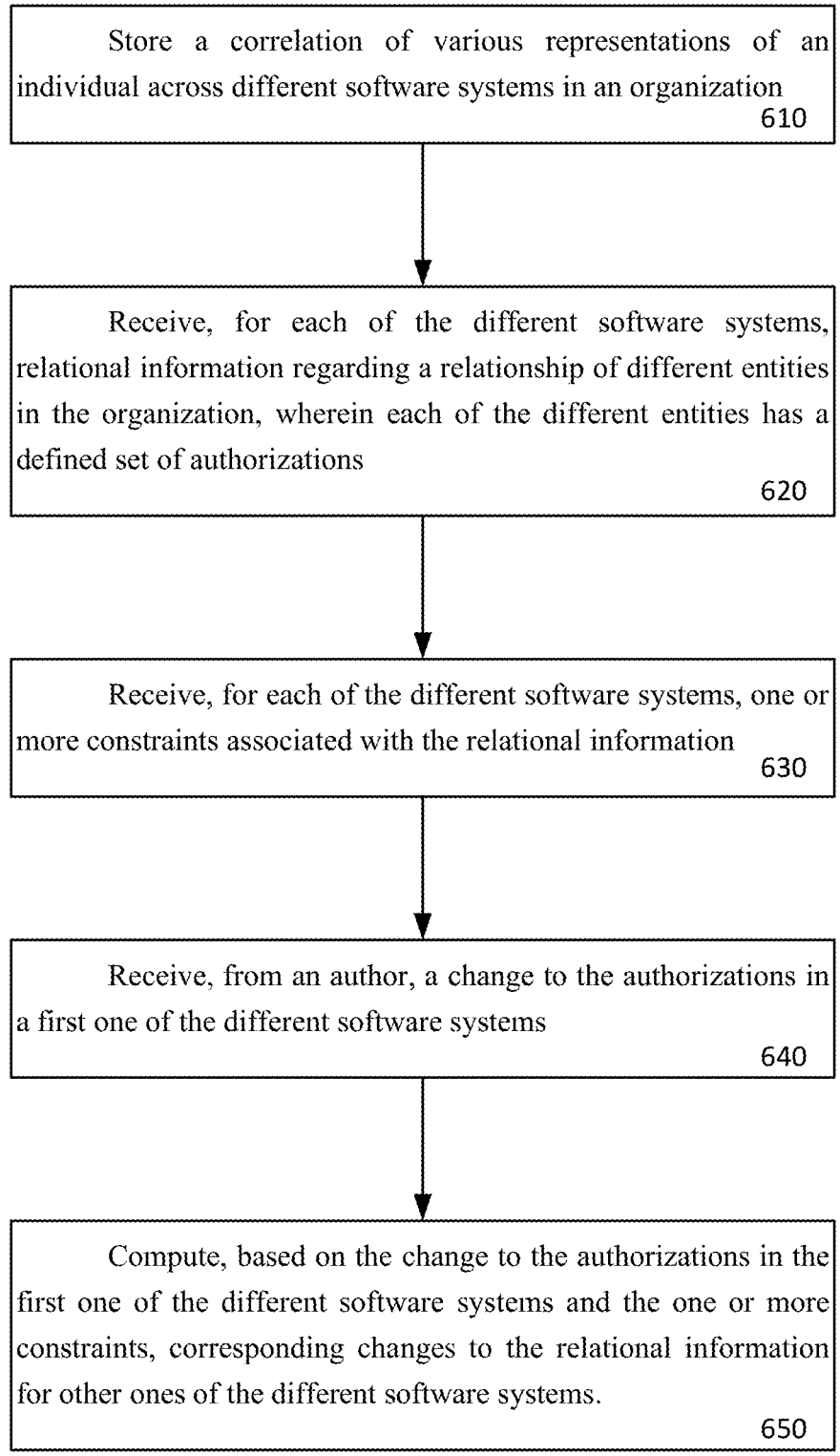
FIG. 6 is a flow diagram illustrating an example method according to aspects of the disclosure.

FIG. 6 illustrates an example method 600 or ensuring consistency in authorization across different software systems in an organization. While the operations are described in a particular order, it should be understood that the order may be modified and that operations may be added or omitted.

In block 610, a correlation of various representations of an individual across different software systems in an organization is stored. For example, an employee of a company may be represented by different identifiers having different formats in different software systems. By way of example only, such different software systems may include an attendance logging system, file storage/sharing system, employee benefits system, etc. While in one system the individual may be represented by a username, in others the individual may be represented by a different user name, an email address, a numeric identifier, etc. Such various representations may be stored in a lookup table, relational database, or any other data format.

In block 620, for each of the different software systems, relational information is received regarding a relationship of different entities in the organization, wherein each of the different entities has a defined set of authorizations. For example, the relational information may include hierarchical information, where each hierarchy corresponds to a different entity. For example, referring back to FIG. 3, the product hierarchy is related to the organization hierarchy. Other examples of entities in the organization may include teams, jobs, roles, individuals, tasks, etc. The defined set of authorizations may define permissions or responsibilities associated with the entity.

In block 630, for each of the different software systems, one or more constraints associated with the relational information are received. The constraints may be, for example, rules or policies that should be followed for any change to data, such as changes in roles, teams, etc. According to some examples, the system may be able to detect inconsistencies among the one or more constraints for the different software systems.

In block 640, a change to the authorizations is received from an author in a first one of the different software systems. By way of example, a human resources manager may change an employment status for a particular individual. As just another example, an owner of data may temporarily change the access permissions to the data for a particular individual. Computing the corresponding changes may include applying a domain-specific programming language. For example, the programming language may be strictly typed against a global dynamically-bound type state. The programming language may be applied along with trees to allow extensive static analysis to avoid re-evaluating all constraints for every change. Computing the corresponding changes may include transactionally managing policy programs as data.

In block 650, corresponding changes to the relational information are computed for other ones of the different software systems. Such computation is based on the change to the authorizations in the first one of the different software systems and the one or more constraints.

CONCLUSION

The present system is a transactional, constraint-based system for effective authorization that takes ownership of key pieces of data and functionality that are common across multiple systems. It consists of three primary elements: (1) The Unified Identity Store, a subsystem that provides the flexibility of having a unique, non-leaking, internal unique identifier for people and track the various representations and manifestations of identity across other systems; (2) The Administrative Hierarchy Store, a subsystem to canonically record the various relationships of assets and structures in an organization; and (3) the policy programming language, a Turing-complete, domain-specific language powerful enough to express policies as user-provided programs.

Authorization and evaluation can then be assisted by the system by evaluating these programs and their consequences based on the canonical information in its constituent stores.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for ensuring consistency in authorization across different software systems in an organization, the system comprising:
   one or more memories storing a correlation of various representations of an individual across the different software systems in the organization;
   one or more processors in communication with the one or more memories, the one or more processors configured to:
      receive, for each of the different software systems, relational information regarding a relationship of different entities in the organization, wherein each of the different entities has a defined set of authorizations;
      receive, for each of the different software systems, one or more constraints associated with the relational information;
      receive, from an author, a change to the authorizations in a first one of the different software systems;
      compute, based on the change to the authorizations in the first one of the different software systems and the one or more constraints, corresponding changes to the relational information for other ones of the different software systems; and
      automatically update the other ones of the different software systems with the corresponding changes.

2. The system of claim 1, wherein the different entities are one of jobs, teams, roles, individuals, or tasks.

3. The system of claim 1, wherein the relational information comprises hierarchical information.

4. The system of claim 3, wherein the hierarchical information comprises one or more trees.

5. The system of claim 1, wherein the one or more processors are further configured to detect inconsistencies among the one or more constraints for the different software systems.

6. The system of claim 1, wherein the defined set of authorizations defines at least one or permissions or responsibilities associated with the entity.

7. The system of claim 1, wherein computing the corresponding changes comprises applying a domain-specific programming language.

8. The system of claim 7, wherein the programming language is strictly typed against a global dynamically-bound type state.

9. The system of claim 7, wherein computing the corresponding changes comprises transactionally managing policy programs as data.

10. The system of claim 7, wherein the programming language is applied along with trees to allow extensive static analysis to avoid re-evaluating all constraints for every change.

11. A method for ensuring consistency in authorization across different software systems in an organization, the method comprising:
    storing a correlation of various representations of an individual across the different software systems in the organization;
    receiving, at one or more processors, for each of the different software systems, relational information regarding a relationship of different entities in the organization, wherein each of the different entities has a defined set of authorizations;

receiving, at the one or more processors, for each of the different software systems, one or more constraints associated with the relational information;

receiving, at the one or more processors, from an author, a change to the authorizations in a first one of the different software systems;

computing, at the one or more processors, based on the change to the authorizations in the first one of the different software systems and the one or more constraints, corresponding changes to the relational information for other ones of the different software systems; and automatically updating the other ones of the different software systems with the corresponding changes.

12. The method of claim 11, wherein the different entities are one of jobs, teams, roles, individuals, or tasks.

13. The method of claim 11, wherein the relational information comprises hierarchical information.

14. The method of claim 13, wherein the hierarchical information comprises one or more trees.

15. The method of claim 11, further comprising detecting inconsistencies among the one or more constraints for the different software systems.

16. The method of claim 11, wherein the defined set of authorizations defines at least one or permissions or responsibilities associated with the entity.

17. The method of claim 11, wherein computing the corresponding changes comprises applying a domain-specific programming language.

18. The method of claim 17, wherein the programming language is strictly typed against a global dynamically-bound type state.

19. The method of claim 17, wherein the programming language is applied along with trees to allow extensive static analysis to avoid re-evaluating all constraints for every change.

20. A non-transitory computer-readable medium storing instructions executable by one or more processors for performing a method for ensuring consistency in authorization across different software systems in an organization, the method comprising:

storing a correlation of various representations of an individual across the different software systems in the organization;

receiving, for each of the different software systems, relational information regarding a relationship of different entities in the organization, wherein each of the different entities has a defined set of authorizations;

receiving, for each of the different software systems, one or more constraints associated with the relational information;

receiving, from an author, a change to the authorizations in a first one of the different software systems;

computing, based on the change to the authorizations in the first one of the different software systems and the one or more constraints, corresponding changes to the relational information for other ones of the different software systems; and automatically updating the other ones of the different software systems with the corresponding changes.

* * * * *